Dec. 30, 1952 E. E. MASTERSON 2,623,750

AUTOMATIC REVERSING SYSTEM FOR TAPE REELING MACHINES

Filed June 30, 1950 2 SHEETS—SHEET 1

INVENTOR
EARL E. MASTERSON
BY Morris A. Rakin
ATTORNEY

INVENTOR
EARL E. MASTERSON
BY Morris L. Rabkin
ATTORNEY

Patented Dec. 30, 1952

2,623,750

UNITED STATES PATENT OFFICE 2,623,750

AUTOMATIC REVERSING SYSTEM FOR TAPE REELING MACHINES

Earl E. Masterson, Palmyra, N. J., assignor to Radio Corporation of America, a corporation of Delaware Application June 30, 1950, Serial No. 171,492

6 Claims. (Cl. 274—11)

Figure 1:
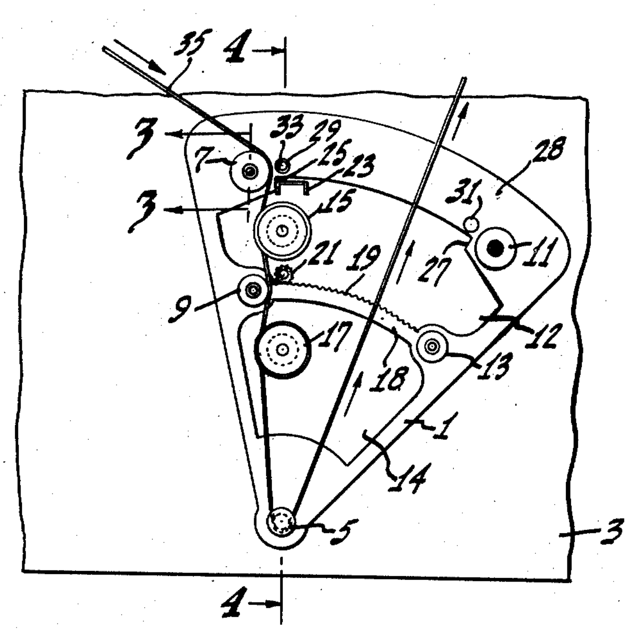

The present invention relates to tape reeling mechanisms, and more particularly to automatic reversing systems for such reeling mechanisms as are used in sound translating apparatus which employ magnetic tape records.

The automatic reversing system constituting the present invention will be described as applied to a reeling system of the type more generally described and claimed in a copending joint application of Earl E. Masterson and Noel Urquhart, Serial No. 84,634, filed March 31, 1949, now Patent No. 2,524,064, issued October 3, 1950. The reeling system described therein is designed, primarily, to coordinate the movement of a dual sound track magnetic record with respect to a double ended transducer. Such a transducer is described and claimed in the copending application of Earl E. Masterson, Serial No. 62,754, filed November 30, 1948, now Patent No. 2,524,063, issued October 3, 1950.

The transducer, as described in the above applications has a core structure that is disposed at an angle within a housing member. The opposite ends of the structure are arranged in such a way that one end is in line with and adapted to contact one of the sound tracks on the record, while the other end is in line with and adapted to contact the other sound track. The reeling system provides means for guiding the tape into contact with either one or the other of the two ends of the transducer. This operation is accomplished by a double set of guide members mounted on a movable sector plate. The sector plate is pivoted about a tape-driving capstan which is located near the vertex of the plate. An aperture is provided in the plate through which the transducer extends. When the sector plate is moved to one of its extreme positions, the guide members hold the tape in contact with one end of the transducer. Similarly, when the plate is shifted to its other extreme position, the tape is held against the other end of the transducer. In the apparatus disclosed in the aforementioned application of Masterson and Urquhart, the sector plate was shifted manually from one position to the other. This required that some one attend the apparatus and, when the tape neared the end of its travel in one direction, perform the necessary operations to shift the sector plate and reverse the direction of rotation of the capstan.

It is an object of the present invention to provide an improved tape reeling system wherein the direction in which the tape is traveling may be reversed automatically.

Another object of this invention is the provision of an improved reeling system, as aforesaid, which is particularly suited for use in magnetic recording and reproducing apparatus.

It is a further object of the present invention to provide, in sound translating apparatus employing tape records, means for automatically reversing the direction of travel of the tape.

Still another object of the invention is the provision of an improved tape reeling system as set forth above and which includes automatic means for altering the path in which the tape travels substantially simultaneously with the aforesaid change in direction.

It is a still further object of this invention to provide, in a tape reeling system, automatic means for shifting the tape from one preselected path to another such path.

To accomplish these and other objects, there has been provided a pair of sensing members so positioned that one or the other is in physical contact with a tape being reeled. An actuating element to which the sensing element is responsive, such as a small piece of electrically conductive material, is provided on the tape near either end thereof. As the tape is being reeled in one direction, the actuating element passes one of the sensing elements. The sensing element, in response to the passing of the actuating element, closes an electrical circuit to a solenoid. Operation of the solenoid causes one set of tape guide members mounted on a movable mounting or sector plate to release the tape from contact with one end of a double ended transducer while a second set of guide members, similarly mounted, move the tape into contact with the other end of the transducer. Movement of the sector plate from one of its two extreme positions to the other actuates a cooperating switch to reverse the direction of a motor which, in turn, drives a capstan. Rotation of the capstan controls the longitudinal movement of the tape.

Figure 2:
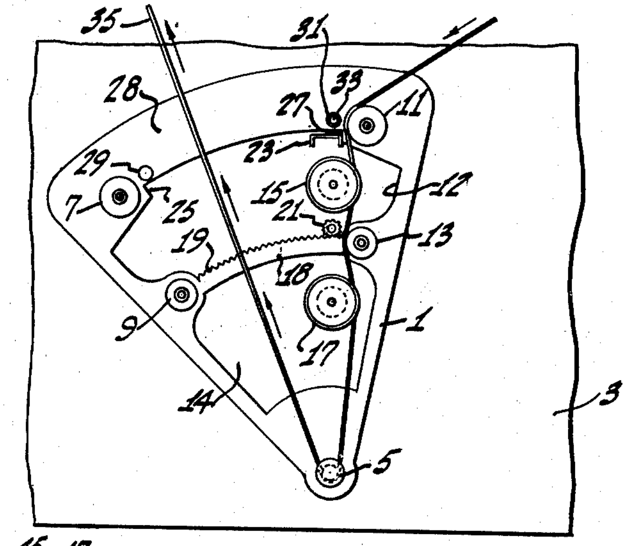
Figure 3:
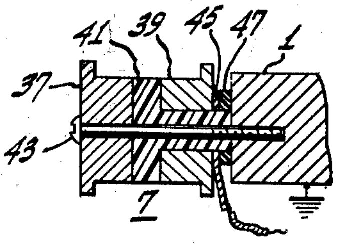
Figures 4, 5:
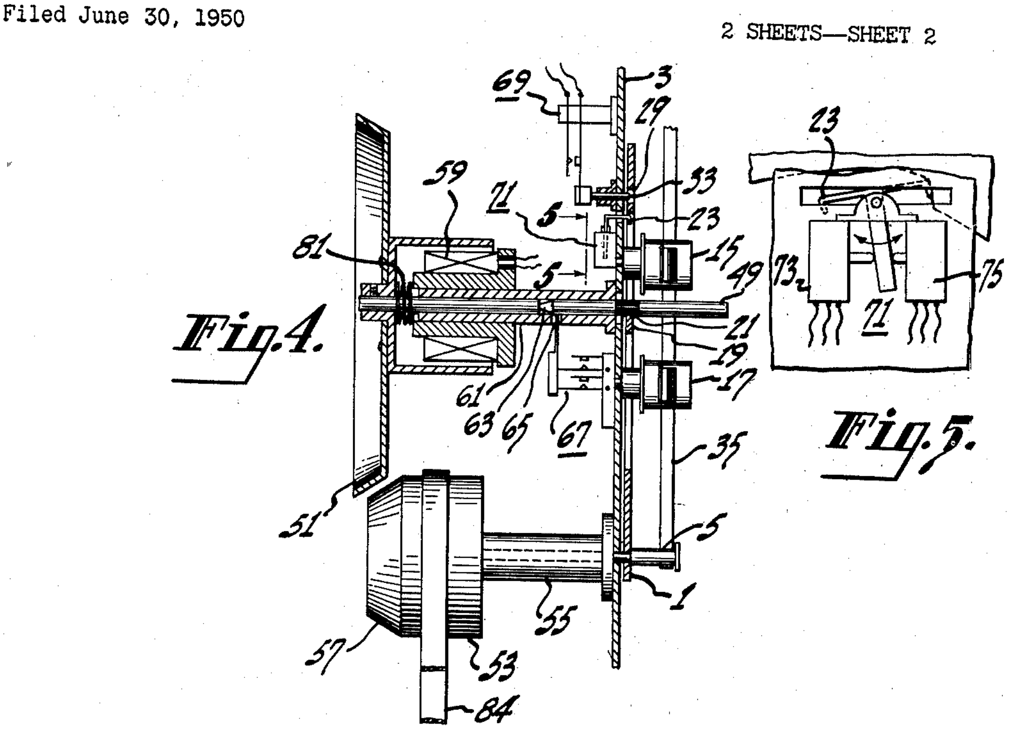
Figure 6:
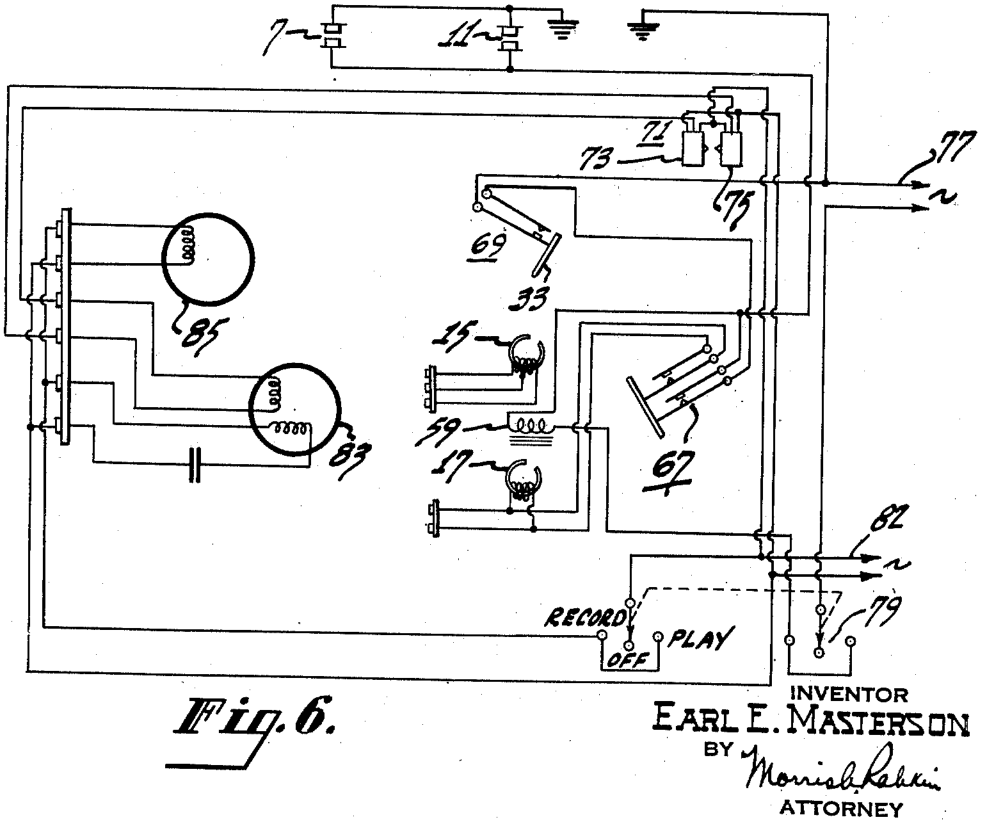

A better understanding of the present invention may be had from the following detailed description when read in connection with the accompanying drawings in which:

Figure 1 is a front view showing one form of tape shifting mechanism according to my present invention with the sector plate in one of its extreme positions, Figure 2 is a view similar to Fig. 1, but shows the sector plate in the other of its extreme positions, Figure 3 is an enlarged, cross-sectional view taken on the line 3—3 of Figure 1 and showing a sensing element suitable for use in the system of the present invention, Figure 4 is a view, partly in cross-section, taken along the line 4—4 of Fig. 1 and looking in the direction of the appended arrows, Figure 5 is an enlarged side view taken along the line 5—5 of Fig. 4 and looking in the direction of the appended arrows, and Figure 6 is a schematic wiring diagram of an electrical circuit arranged in accordance with the present invention.

Referring to the drawings in more detail, in Figures 1 and 2 there is shown a sector plate 1 movably mounted on a mounting panel 3 by being pivoted about a tape driving capstan 5. A pair of tape guide members 7 and 9 is mounted on the left side of the sector plate. On the right side of the sector plate, a similar pair of tape guide members 11 and 13 is mounted, the sector plate constituting a common movable mounting plate for the guide members. The uppermost guide members 7 and 11 of each pair serve also as sensing elements, one of which is shown in more detail in Fig. 3. In Figures 1 and 2, it may also be seen that the sector plate 1 has two large central apertures 12 and 14. Mounted on the mountng panel 3 and extending through the apertures is a pair of transducers, the upper one being an erasing head 15 and the lower one being a record-playback head 17, constructed in accordance with the aforementioned application of Masterson. A cross-bar member 18, which is shown as running between the two lower guide members 9 and 13, is formed with a curved rack gear or gear sector 19. A pinion gear 21 is positioned to engage the rack gear 19 to drive the sector plate from one position to the other. Protruding through an opening in the mounting panel 3 is a motor-reversing switch operating lever 23. A pair of opposed shoulders 25 and 27 on the sector plate 1 operate the switch lever 23. The sector plate 1 includes an upper cross-bar member 28 which is formed with a pair of small apertures or detents 29 and 31 adapted to receive an operating plunger 33 of a limit switch when the sector plate is in either of its extreme positions. A tape 35 is held in contact with either end of the transducers 15 and 17 by one pair of guide members 7 and 9, or 11 and 13, depending on the position of the sector plate.

The sensing element 7, shown in Figure 3, comprises an outer flange member 37 and an inner, opposed flanged member 39. The flanged members are made of electrically conductive material and are separated by an insulating member 41. An electrically conductive screw 43 secures the assembly to the sector plate 1. The screw also serves to electrically connect the outer flanged member 37 to the sector plate which, in turn, is grounded. A source of electric current is connected to the inner flanged member 39 through a contact terminal 45. An insulating washer 47, together with the insulating member 41, isolates the inner flanged member, electrically, from the rest of the assembly.

The side view of the device, Figure 4, shows the pinion gear 21 as being formed on a shaft 49, one end of which is rigidly connected to beveled wheel 51. A flywheel 53 is attached to the capstan 5 through a suitable shaft and bearing 55. The fly-wheel has a rubber-tired, beveled surface 57 which is adapted to be engaged by the beveled wheel 51. The beveled surfaces of the flywheel and the beveled wheel constitute a clutch assembly for driving the pinion gear 21. The pinion gear shaft 49 is mounted to permit a limited axial movement thereof with respect to the mounting panel 3. Although this shaft, together with the beveled wheel 51, is normally spring biased to its rearmost positioned, as shown, energization of a solenoid 59 disposed about the pinion gear shaft 49 causes that shaft to move to a forward position. Surrounding the pinion gear shaft and supporting the shaft assembly is a bearing 61. It may be seen that the pinion gear shaft 49 has a section 63 with a reduced diameter. In a position where it will be aligned with the section of reduced diameter when the pinion gear shaft is in its forward position, there is an opening 65 in the bearing 61. A switch bank 67, which, for convenience, will be called a holding switch, has an operating plunger inserted in the opening. As the shaft 49 moves from one of its positions to the other, the holding switch plunger is caused to move, by the change in the diameter of the shaft, from one of its positions to the other.

A second switch 69, which will be designated as a limit switch, has the operating plunger 33 which is adapted to be cammed from one of its positions to the other by the sector plate 1 and its detents 29 and 31, as previously pointed out.

There is also provided a motor-reversing switch 71 (shown more clearly in Fig. 5) mounted so that the ends of its operating levers 23 protrude through the mounting panel 3 whereby the switch may be actuated by the shoulders 25 and 27 on the sector plate 1. The switch, itself, may consist of a pair of oppositely disposed, single-pole, double-throw, micro switches 73 and 75, as shown.

The operation of the system of the present invention may be more readily understood by referring to the mechanical features, enumerated above, and to the circuit diagram shown in Fig. 6. In the circuit diagram there is shown a first source of alternating current 77 connected to a series arrangement of the limit switch 69, the lower pair of contacts on the holding switch 67, the solenoid 59, and an on-off switch 79. The sensing elements 7 and 11 are connected in parallel with each other and with the aforementioned contacts of the switches 67 and 69. When the tape 35 is being reeled, the sector plate, 1 is in one of its extreme positions, as shown in Figures 1 and 2, and the contacts on the switches 67 and 69 are open, as shown in Figures 4 and 6. A piece of electrically conductive material, such as metal foil, is fastened to the tape near the point where it is desired to reverse the direction of reeling. When this metal foil comes into contact with the two members of either of the sensing elements 7 or 11, an electrical circuit is completed, energizing the solenoid 59. The solenoid shifts the pinion gear shaft 49 to its forward position where the beveled wheel 51 engages the beveled surface 57 of the rotating flywheel 53. The flywheel 53 turns the beveled wheel 51, which, in turn, drives the pinion gear 21. The turning of the pinion gear starts the sector plate 1 moving in the direction of its opposite extreme position. As soon as the sector plate moves, the plunger 33 of the limit switch 69 is cammed out of the aperture 29 and the switch is closed. When the solenoid 59 shifts the shaft 49 to its forward position, the section of reduced diameter 63 is aligned with the opening 65 in the bearing 61, thereby allowing the plunger of the holding switch 67 to close the lower contacts of the switch. Therefore, as soon as the sector plate 1 starts to move, a second circuit between the solenoid 59 and the source of current 77 is closed. Thus, the solenoid remains energized until the sector plate has reached its other extreme position. At that time, the plunger 33 of the limit switch 69 is biased into one of the apertures 29 or 31 in the sector plate, opening the contacts and breaking the circuit to the solenoid. When the solenoid is deenergized, the pinion gear shaft 49 is biased to its rearmost position by a spring 81, thus disengaging the beveled wheel 51 from the flywheel 53.

When a pair of single-pole, double-throw microswitches 73 and 75 is used for the motor-reversing switch 71, a suitable connection is shown in Fig. 6, wherein the arrangement is equivalent to a double-pole, double-throw reversing switch. When the sector plate 1 is shifted from one of its extreme positions to the other, one or the other of the shoulders 25 or 27, depending on the direction of the shift, engages the operating lever 23 of the motor-reversing switch 71. The lever 23 then operates the switch, reversing the connections between a second source of current 82 and a reversible motor 83, thereby reversing the direction of the motor 83 which is mechanically connected by means of a belt 84, the capstan 5 and its associated flywheel 53. It should be understood that the particular circuit arrangement shown in the drawings is not a requisite for the present invention and that other suitable circuit arrangements may be used. By way of example, a single-switch may be used as the motor-reversing switch by making suitable adjustments in the circuitry.

Since, in the arrangement illustrated, the mechanism that shifts the sector plate derives its power and direction from the flywheel, a reversal in the direction of rotation of the flywheel will cause the sector plate to be shifted back to its original extreme position when a second piece of metal foil comes into contact with one of the sensing elements 7 or 11. Thus, in a magnetic record phonograph, a first piece of metal foil may be attached to the record tape at one end of the record thereon and a second piece attached to the tape at the other end of the record, leaving sufficient blank tape at both ends so that the tape is not completely unreeled from either reel. In the system of the present invention, as applied to the magnetic sound translating apparatus disclosed in the previously mentioned copending applications, a dual-track record, prepared as above, would have one sound track played in one direction of travel of the tape; upon reaching the end of the first track, and hence, one of the metal foils, the direction of travel would be automatically reversed and the other track played to its end, where, upon reaching the second piece of metal foil, the system would be rereversed automatically. The succession of reversals and rereversals will continue until stopped by an operator. Such apparatus could well be used to provide entertainment in the home, or to provide dinner music and the like for restaurants, with very little attention by an operator.

In Figure 6, it may be seen that the upper pair of contacts of the holding switch 67, when closed, short circuit the transducer 17. Thus, any objectionable noises that may be incident to the reversal of the direction of tape travel are not impressed on an audio amplifier associated with the transducer. A reel driving motor 85 is also shown, diagrammatically, in Fig. 6. This motor need not be reversible. A reeling system adapted to be used in apparatus of the type contemplated in the present invention is described and claimed in a copending application of the present inventor, Serial No. 37,845, filed July 9, 1948, wherein the reels, upon which the tape is reeled, are driven, through a friction drive arrangement, by a constant speed, single direction motor.

While the present invention has been illustrated and described as utilizing power from the capstan flywheel to shift the sector plate, it should be apparent that other methods of deriving the plate-shifting force are within its scope. For example, instead of using the solenoid 59 to shift the beveled wheel 51 into contact with the flywheel, a solenoid may be used to shift the sector plate directly; or a pair of solenoids, connected alternately through a reversing switch arrangement similar to that shown connected to the capstan motor in Fig. 6, may be used to shift the sector plate. Other changes within the spirit of my present invention will, no doubt, also readily suggest themselves to those skilled in the art. I therefore desire that the foregoing description shall be taken as illustrative and not as limiting.

What is claimed is:

1. A tape reeling system for tapes having actuating elements, said system comprising, in combination, a rotatable capstan for driving the tape, a plate pivotally mounted about said capstan, said plate being adapted to be moved to either of two extreme positions, a plurality of guide members mounted on said plate for guiding the tape in either of two preselected paths, a sensing element responsive to said actuating elements, means responsive to said sensing element for shifting said plate and the associated guide members from one of said positions to the other whereby to shift the travel of the tape from one of said paths to the other, and means responsive to the movement of said plate for reversing the direction of rotation of said capstan.

2. A tape reeling system for tapes having actuating elements, said system comprising, in combination, a rotatable capstan for driving the tape, a plurality of guide members for guiding said tape in either of two preselected paths, a common, movable mounting plate upon which said guide members are mounted, a sensing element responsive to said actuating elements, a solenoid, means responsive to said sensing element and said actuating elements for energizing said solenoid, means responsive to the energization of said solenoid for shifting said movable mounting plate and the associated guide members from one preselected position to a second preselected position whereby to shift the tape from one of said paths to the other, and means responsive to the movement of said plate to reverse the direction of rotation of said capstan.

3. The invention as set forth in claim 2 and characterized by the addition of means responsive to the movement of said plate for deenergizing said solenoid when said plate has completed its movement in either direction.

4. A tape reeling system for tapes having actuating elements, said system comprising, in combination, a rotatable capstan for driving the tape, a plate pivotally mounted about said capstan, said plate being adapted to be moved to either of two extreme positions, a plurality of guide members mounted on said plate for guiding the tape in either of two preselected paths, at least one of said guide members constituting a sensing element responsive to said actuating elements, a solenoid, means including said sensing element for energizing said solenoid, means operable by said solenoid for moving said plate from one of said extreme positions to the other whereby to shift the travel of the tape from one of said paths to the other, and switch means responsive to the movement of said plate for reversing the direction of rotation of said capstan.

5. In a tape reeling system for tapes having electrically conductive members thereon, the combination of a capstan for driving the tape, a reversible motor mechanically connected to drive said capstan, a movable plate mounted for pivotal movement about said capstan to either of two extreme positions, a plurality of guide members mounted on said plate for guiding the tape in either of two preselected paths, a sensing element comprising a pair of mutually insulated contact members said sensing element being adapted to engage the tape, a solenoid serially connected in an electrical circuit with said sensing element and adapted to be energized upon the passage of one of the electrically conductive members past said sensing element, a rack gear on said plate, a pinion gear engaging said rack gear, a normally disengaged clutch operable by said solenoid to mechanically connect said pinion gear to said reversible motor whereby to shift said plate from one of said positions to the other, and a switch adapted to be actuated by the movement of said plate for reversing the direction of said motor.

6. In sound translating apparatus of the type employing double-ended transducers and dual-track tape records having actuating elements thereon, a reeling system comprising, in combination, a rotatable capstan for driving the tape, a movable plate mounted for pivotal movement about said capstan to either of two extreme positions, guide means for said tape mounted on said plate, said guide means being adapted to guide the tape into contact either with one end of the transducers or the other depending on the position of the plate, a sensing element responsive to said actuating elements in the path of the tape, a solenoid, means responsive to said sensing element to energize said solenoid, means responsive to said solenoid for shifting said plate from one of said positions to the other, and a switch adapted to be actuated by the movement of said plate for reversing the direction of rotation of said capstan.

EARL E. MASTERSON.

REFERENCES CITED

The following references are of record in the file of this patent:

UNITED STATES PATENTS

| Number | Name | Date |
|---|---|---|
| 2,328,597 | Woolf | Sept. 7, 1943 |
| 2,524,064 | Masterson et al. | Oct. 3, 1950 |

FOREIGN PATENTS

| Number | Country | Date |
|---|---|---|
| 392,641 | Great Britain | May 25, 1933 |